UNITED STATES PATENT OFFICE.

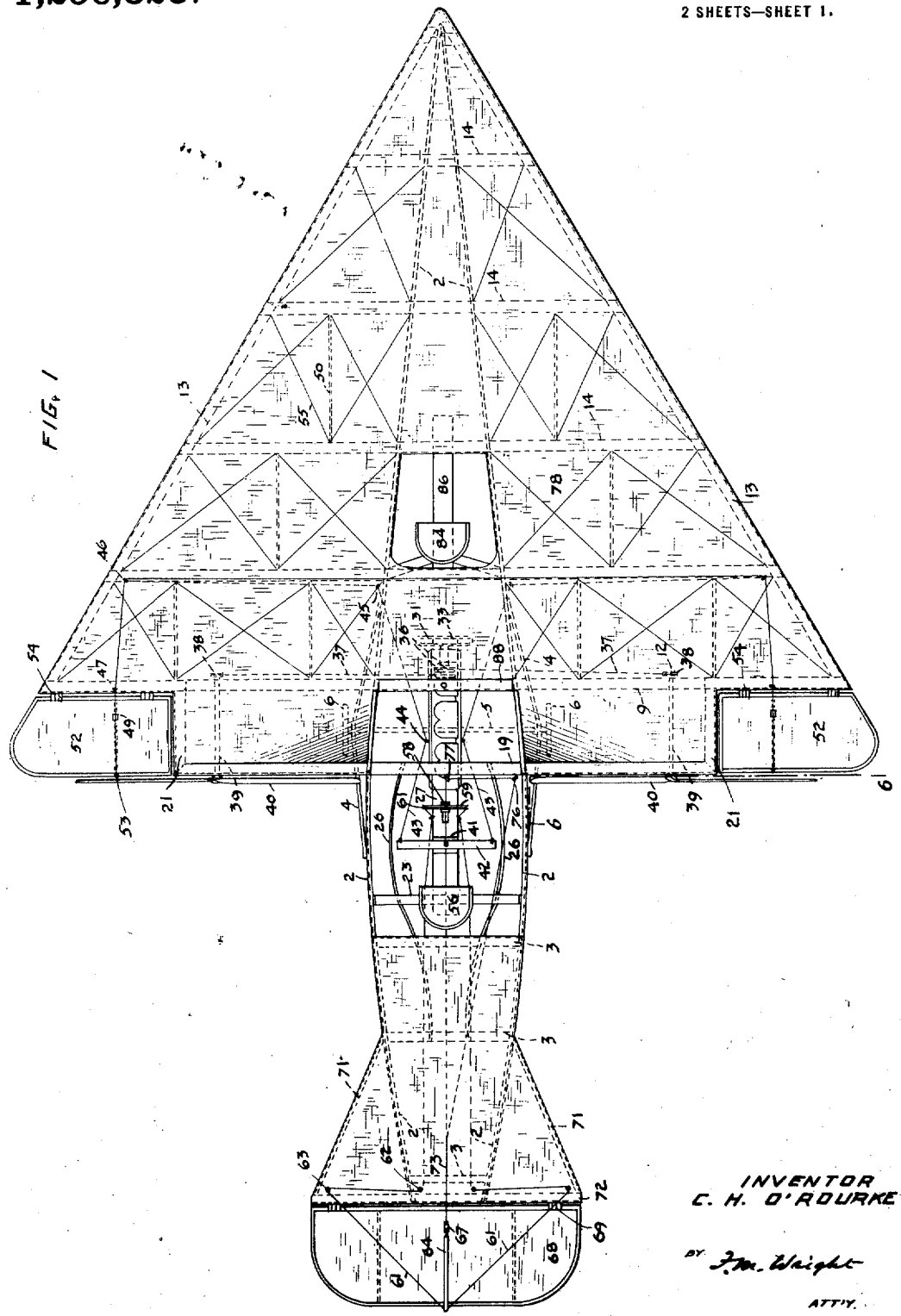

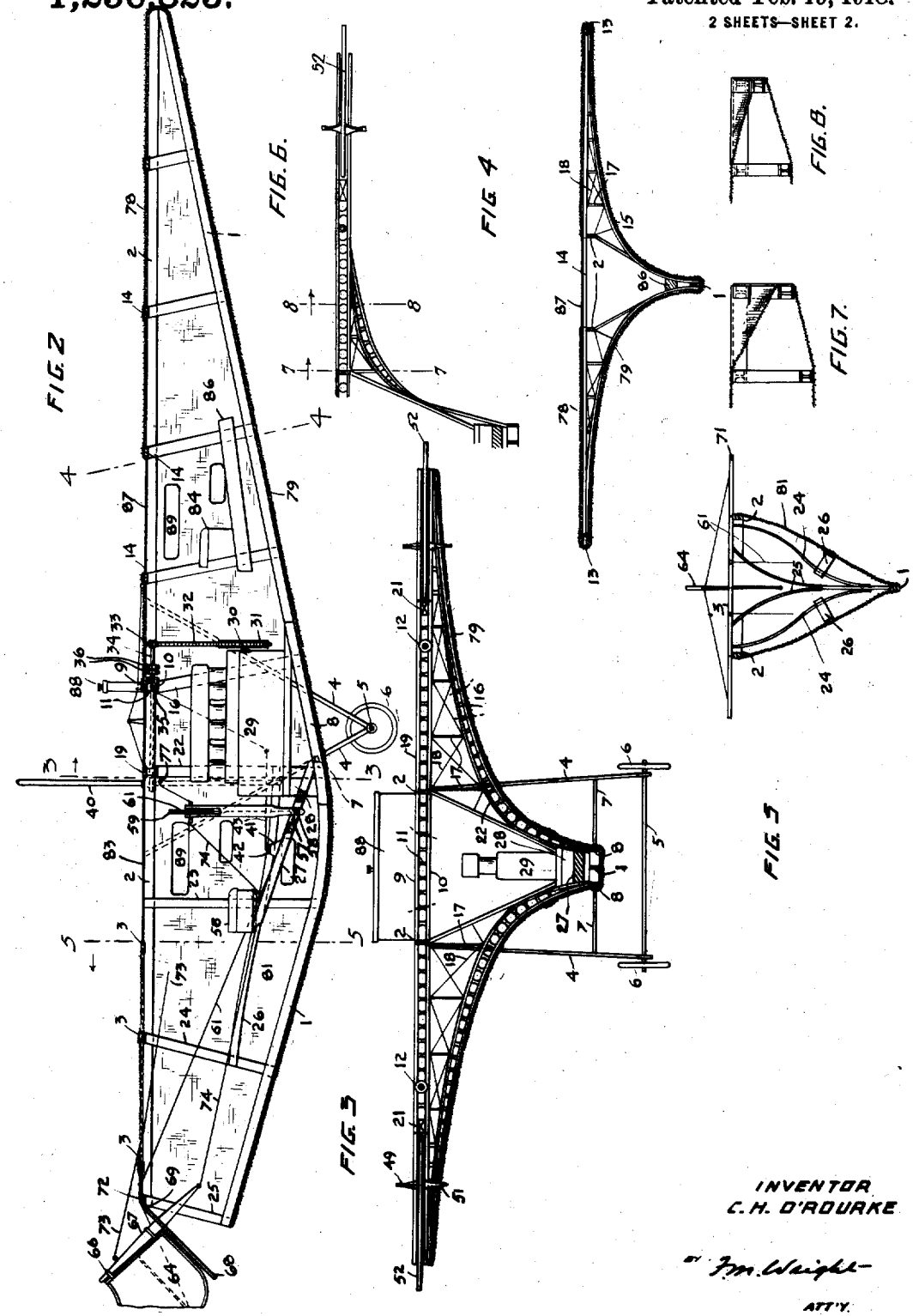

CORNELIUS H. O'ROURKE, OF HANFORD, CALIFORNIA.

AEROPLANE.

1,256,823.	Specification of Letters Patent.	Patented Feb. 19, 1918.

Application filed September 19, 1917. Serial No. 192,045.

*To all whom it may concern:*

Be it known that I, CORNELIUS H. O'ROURKE, a citizen of the United States, residing at Hanford, in the county of Kings and State of California, have invented new and useful Improvements in Aeroplanes, of which the following is a specification.

The present invention relates to improvements in aeroplanes, one object of the invention being to provide an aeroplane which will have small head resistance and thus will be able to travel at very high speed. Another object is to provide an aeroplane which will have great stability both in a lateral and in a longitudinal direction.

In the accompanying drawing, Figure 1 is a plan view of the aeroplane; Fig. 2 is a longitudinal central section thereof; Figs. 3, 4, 5, are transverse vertical sections on the lines 3—3, 4—4, and 5—5 respectively of Fig. 2; Fig. 6 is a detail cross section on the line 6—6 of Fig. 1, and Figs. 7 and 8 are detail longitudinal sections on the lines 7—7 and 8—8 respectively of Fig. 6.

Referring to the drawing, 1 indicates the central keel of the aeroplane, sloping downward from its front end to a point somewhat to the rear of its middle and then sloping upward to its rear end. To the front end of the keel are secured upper side pieces 2 of the body frame of the aeroplane, said side pieces extending in a horizontal plane and diverging rearwardly from each other to points somewhat in front of the lowest point of the keel and then again converging to the rear. Said side pieces 2 are braced at the rear by transverse horizontal bars 3. To each side piece are secured the upper ends of a V-shaped support 4, which supports are formed through their apices with suitable bearings for a transverse wheel shaft 5, mounted on wheels 6 adapted to travel on the ground. Said supports are held against movement in a transverse direction by braces 7, each secured at its outer end to the rear leg of a V-shaped support and at its inner end to a bow-shaped piece 8, said bow-shaped pieces extending in a general longitudinal direction on opposite sides of the keel in front of the lowest point thereof, and secured at their front and rear ends to said keel.

Extending in a transverse direction respectively above and below said side pieces 2 and secured thereto are cross bars 9 and 10, braced at intervals of their length by short braces 11 and which are secured intermediate of their length to and respectively above and below bearing pieces 12, their ends being secured to the rear ends of side bars 13, which converge forwardly from said bars 9 and 10 and meet at the front end of the keel, to which they are secured. Also secured at their ends to the side bars 13 and to the side pieces 2 are cross bars 14 suitably spaced from each other in a series gradually increasing in length from the front to the cross bars 9, 10 and connected with each other by struts 50 and ties 55. Secured at their lower ends to the keel, and extending upwardly and outwardly to meet the side pieces 13, to which their other ends are secured, are a series of transverse braces 15 of an approximately parabolic form, which braces, of course, gradually diminish in length forwardly. Braces 16 of parabolic form are also secured at their lower ends to said bow-shaped pieces 8 and at their upper ends to the outer ends of the bars 9, 10. The cross bars 10 and 14 are connected with the parabolic braces 16 and 15 by struts 17 and ties 18. An upper cross piece 19 and a lower cross piece 20 are secured to the side pieces 2 of the body to the rear of the cross pieces 9, 10, but of less length than said cross pieces 9, 10, and their ends are secured to the rear ends of short longitudinally extending pieces 21, the front ends of which extend between the cross pieces 9, 10, and are secured thereto. Approximately parabolic braces 22 are secured at their lower ends to the bow pieces 8, and at their upper ends to the ends of the cross pieces 19, 20. Pairs of braces 23, 24, 25, are secured at their lower ends to the rear portion of the keel at successive points and at their upper ends to the side pieces 2 of the body frame. Shaper pieces 26 extend longitudinally on opposite sides of the aeroplane and are curved outward at the center and are secured at their front ends to the parabolic braces 22 and at their rear ends to a pair of braces 24. Between the lower portions of said braces 22 is secured the front end of a short beam 27, said beam extending longitudinally rearward and upward from said braces 22, its rear end being secured between, and resting upon, the braces 23. Upon the front end of said beam is secured a block 28 and between the lower ends of the braces 16 is supported the casing 29 of an internal combustion engine having a radiator 88, and of which the shaft 30 extends forwardly and carries a pulley 31 around which extends a chain 32, which also extends around a pulley 33 mounted on a shaft 34 which extends forwardly from a central bearing piece 35 secured to the upper and lower cross bars 9, 10, and around pulleys 36 on said shaft extend bands 37 which extend also around pulleys 38 on the front ends of shafts 39 which extend in a longitudinal direction through the bearing pieces 11 and 17, and carry at their rear ends propellers 40 by which the aeroplane is propelled.

Pivoted upon a block 41 secured on the beam 27 is a transverse balancing bar 42, to the ends of which are secured cords 43 which extend through guiding eyes 44, 45, 46 and 47, and are secured, first, to short posts 49, 51, extending respectively upwardly and downwardly from ailerons 52 and are then secured, as shown at 53, to the rear edges of said ailerons. Said ailerons are hinged at their front edges, as shown at 54, to the cross bars 9, and occupy the spaces at the corners of the triangular frame formed by the converging side bars 13 and the cross bars 9, 10, adjacent to the short pieces 21. The outer sides of said ailerons are in line with the converging side bars 13.

Supported upon the rear end of the beam 27 between the braces 23 is an aviator's seat 56 located so that the aviator can conveniently operate with his feet the balancing bar 42. Extending through a slot 57 in said beam in front of said balancing bar 42 and pivoted to said beam is a steering post 58 forked at its upper end, and carrying in said forked end a steering wheel 59. Around said steering wheel extends a cord 61, both portions of which leaving said wheel extend rearwardly and upwardly and around guides 62, 63, and are attached to the rear edge of a horizontal direction rudder 64, hinged, as shown at 66, to a rudder post 67. Said rudder post extends through, and is attached to, a vertical direction rudder 68, hinged, as shown at 69, to the rear edge of the tail of the aeroplane, the frame of which tail is formed by means of a rear transverse bar 72 and outwardly diverging bars 71, the front ends of which are attached to the side pieces 2 of the body frame near their junctures with upwardly extending braces 24 and a horizontal bar 3. The vertical direction rudder, which extends horizontally, is vibrated by means of cords 73, 74, attached respectively to upper and lower portions of the rudder post 67 and suitably guided, as shown at 76, 77, and attached to the fork members of the steering post in line with the shaft of the steering wheel. It will be seen that, with this arrangement, when the aviator moves the steering post forwardly, he thereby swings the vertical direction rudder downwardly and therefore depresses the aeroplane. Conversely, when he moves it rearwardly he draws the upper portion of the steering post forwardly and thereby elevates the vertical direction rudder, and, consequently, elevates the aeroplane. If the aviator turns the steering wheel he thereby causes the aeroplane to turn to the right or the left, as the case may be.

The frame is covered with suitable fabric, or other sheet material, the portion 78 of said fabric which covers the upper portion of the frame being flat, while the portion 79 of the fabric which covers the lower portion of the frame is at the front in two surfaces of a general paraboidal form, and at the rear its suraces 81 are curved convexly. The upper surface may be entirely closed, or, as shown in the drawings, an opening 83 may be left therein above the seat and the steering post. Windows 89 in the sides of the body casing are provided for the convenience of the aviator. A passenger seat 84 is also provided, resting upon a suitable longitudinally extending support 86 supported upon two of the parabolic braces 15, and an opening 87 is provided in the casing of the aeroplane immediately above said passenger seat.

As clearly shown in Figs. 1, 6, 7, 8, those parts of the upper covering of the frame which are to the rear of the cross piece 9, and to the inner sides of the shafts 39, curve downward to the rear, the rear edges of the parts thereof close to said shafts 39 being attached to the lower cross bar 20, and those parts thereof which are more remote from said shafts 39 and adjacent to the body portion, being attached to the parabolic brace 22. The object of thus making the rear end of the upper portion of the casing at the front of the aeroplane curve downwardly is to cause it to meet the lower portion of the casing in a sharp edge. Otherwise said sustaining portion of the aeroplane would end in large open spaces which would cause eddy currents at its rear and by reason of the lag thus produced would greatly reduce the speed of the aeroplane.

An aeroplane of this form will develop great speed for the power expended in propelling it, for the reason that it has very little head resistance, as contrasted with the aeroplanes at present in general use, in which a sustaining plane of considerable width is driven through the air with the front edge of the whole length of said plane forced into dead air by the thrust of the propeller. It will be observed that in my invention only a single point, namely the front end, of the aeroplane is forced through the dead air, the front edge of the aeroplane, extending obliquely rearward from the front end, only meeting air which has already been disturbed from its state of quiescence, and which therefore offers very little resistance to penetration by the aeroplane. The difference between the mode of operation of my improved aeroplane and those now in general use, in which the whole of the front edge of the aeroplane encounters the resistance of dead air simultaneously, is much the same as that between the resistance offered to the cutting of a knife which is pressed forward in a direction at right angles to its edge and that offered to the cutting of a knife which, as well as being pressed forward, is drawn in a longitudinal direction parallel with its edge. In the latter case the cutting effect is much greater than in the former. In like manner the cutting of the air by my improved aeroplane can be produced by a much less expenditure of power than by those aeroplanes whose front edges extend in a direction at right angles with the propelling force.

Furthermore, owing to the shape of my improved aeroplane, and especially the body portion thereof, I utilize the resistance necessarily offered to the passage of the aeroplane through the air as a means of sustaining the aeroplane. This is done only to a slight extent with aeroplanes in general use. These aeroplanes have a body portion separate from the sustaining plane, and, in general, no attempt has been made to extend the under side of the body portion to the sustaining plane to produce thereby a lifting effect. In my invention it will be observed that the under side of the casing extends on both sides of the keel in surfaces of general parabolic form through the entire width of the sustaining plane, which is flat on the top, and these under surfaces of the body portion have a general lifting effect.

This is also assisted by the tapering form of the rear portion of the body of my aeroplane.

It will also be observed how very stable, both in a longitudinal and a lateral direction, is my improved aeroplane. The great stability in a longitudinal direction is due to the fact that the depth of the casing increases gradually from front to rear, and therefore, the more rapidly the aeroplane travels, the greater is the tendency of the front portion of the aeroplane to be lifted upward.

The lateral stability is caused by the fact that on each side of the keel of the aeroplane there are parabolic surfaces having a greater lifting tendency at the outer portions than at the inner portions. Since the inner portion of each parabolic surface is more nearly vertical than the outer portion, which is nearly horizontal, the lifting effect on the outer portion of the surface is much the greater, and consequently the aeroplane is always in a position of stable equilibrium, any tendency to tilt in a lateral direction being immediately overcome by the increasing resistance which the under surface of the aeroplane offers to the air on the side toward which it is tilted, thereby causing the aeroplane to be restored to its normal position on an even keel.

I claim:

1. In an aeroplane, a frame comprising horizontally and longitudinally extending side pieces converging from mediate portions toward their front and rear ends and meeting at their front ends, a keel the front end of which is connected to the front ends of the side pieces and which extends rearwardly and downwardly therefrom to a mediate portion thereof, a series of cross pieces suitably spaced from each other secured to said horizontal side pieces and of length increasing rearwardly, rearwardly diverging side bars secured at their front ends to the front ends of the side pieces and of the keel, transversely extending approximately parabolic braces secured at their lower ends to the keel and extending therefrom in a direction first upwardly and then outwardly and secured at their outer ends to said cross pieces and side bars, a casing of sheet material secured to said cross pieces, keel, side bars and parabolic braces, longitudinally extending shafts on opposite sides of the aeroplane, and having their rear ends behind the rearmost cross piece, means for rotating said shafts, and propellers on the rear ends of said shafts.

2. In an aeroplane, a frame comprising horizontally and longitudinally extending side pieces converging from mediate portions toward their front and rear ends and meeting at their front ends, a keel the front end of which is connected to the front ends of the side pieces and which extends rearwardly and downwardly therefrom to a mediate portion thereof and then rearwardly and upwardly, a series of cross pieces suitably spaced from each other secured to said horizontal side pieces and of length increasing rearwardly except the rearmost cross piece which is shorter than the one immediately in front thereof, short longitudinal pieces connecting the outer ends of the rearmost cross piece with the one immediately in front, rearwardly diverging side bars secured at their front ends to the front ends of the side pieces and of the keel, transversely extending approximately parabolic braces secured at their lower ends to the keel and extending therefrom in a direction first upwardly and then outwardly and secured at their outer ends to said cross pieces and side bars, a casing of sheet material secured to said cross pieces, keel, side bars and parabolic braces, ailerons having their front edges hinged to the longest cross piece and their inner edges adjacent to said short longitudinal pieces, longitudinally extending shafts having their rear ends adjacent to and behind the rearmost cross piece, means for rotating said shafts, and propellers on said shafts immediately behind the rearmost cross piece and the ailerons.

3. In an aeroplane, a frame comprising horizontally and longitudinally extending side pieces converging from mediate portions toward their front and rear ends and meeting at their front ends, a keel the front end of which is connected to the front ends of the side pieces and which extends rearwardly and downwardly therefrom to a mediate portion thereof, a series of cross pieces suitably spaced from each other secured to said horizontal side pieces and of length increasing rearwardly, rearwardly diverging side bars secured at their front ends to the front ends of the side pieces and of the keel, transversely extending approximately parabolic braces secured at their lower ends to the keel and extending therefrom in a direction first upwardly and then outwardly and secured at their outer ends to said cross pieces and side bars, a casing of sheet material secured to said cross pieces, keel, side bars and parabolic braces, longitudinally extending shafts on opposite sides of the aeroplane, and having their rear ends behind the rearmost cross piece, means for rotating said shafts, and propellers on the rear ends of said shafts, the casing of sheet material covering the upper portion of the front of the frame curving downward at its rear edge and secured to the same part of the frame as that to which is secured the rear edge of the portion of the casing of sheet material which covers the under side of the frame, thereby avoiding eddy currents.

CORNELIUS H. O'ROURKE.